US008514232B2

(12) United States Patent
Mejdrich et al.

(10) Patent No.: US 8,514,232 B2
(45) Date of Patent: Aug. 20, 2013

(54) PROPAGATING SHARED STATE CHANGES TO MULTIPLE THREADS WITHIN A MULTITHREADED PROCESSING ENVIRONMENT

(75) Inventors: Eric O. Mejdrich, Woodinville, WA (US); Paul E. Schardt, Rochester, MN (US); Robert A. Shearer, Rochester, MN (US); Matthew R. Tubbs, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 520 days.

(21) Appl. No.: 12/824,778

(22) Filed: Jun. 28, 2010

(65) Prior Publication Data
US 2011/0320719 A1 Dec. 29, 2011

(51) Int. Cl.
*G06F 15/80* (2006.01)
(52) U.S. Cl.
USPC .......................... 345/505; 345/506; 711/118

(58) Field of Classification Search
None
See application file for complete search history.

(56) References Cited

U.S. PATENT DOCUMENTS

| 6,195,676 | B1 * | 2/2001 | Spix et al. ..................... 718/107 |
| 6,298,370 | B1 * | 10/2001 | Tang et al. .................... 718/102 |
| 7,734,894 | B1 * | 6/2010 | Wentzlaff et al. ............... 712/10 |
| 2009/0147017 | A1 * | 6/2009 | Jiao .............................. 345/582 |
| 2009/0231349 | A1 | 9/2009 | Mejdrich et al. |
| 2010/0110083 | A1 * | 5/2010 | Paltashev et al. ............. 345/506 |

* cited by examiner

*Primary Examiner* — Xiao M. Wu
*Assistant Examiner* — Greg Raburn
(74) *Attorney, Agent, or Firm* — Wood, Herron & Evans LLP

(57) ABSTRACT

A circuit arrangement and method make state changes to shared state data in a highly multithreaded environment by propagating or streaming the changes to multiple parallel hardware threads of execution in the multithreaded environment using an on-chip communications network and without attempting to access any copy of the shared state data in a shared memory to which the parallel threads of execution are also coupled.

25 Claims, 8 Drawing Sheets

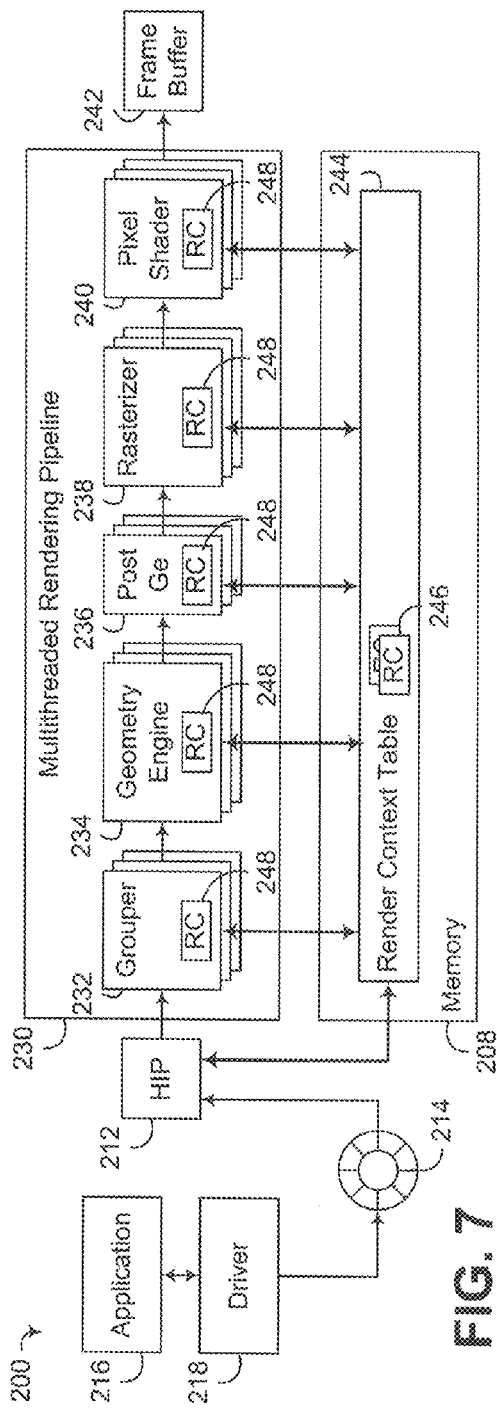
FIG. 7
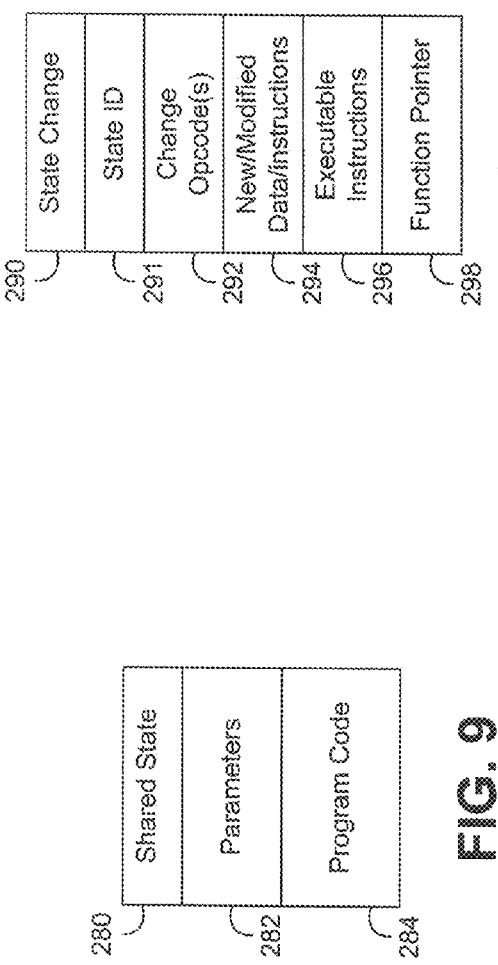
FIG. 10
FIG. 9

PROPAGATING SHARED STATE CHANGES TO MULTIPLE THREADS WITHIN A MULTITHREADED PROCESSING ENVIRONMENT

FIELD OF THE INVENTION

The invention is generally related to data processing, and in particular to maintaining shared state data for multiple threads of execution in a multithreaded processing environment.

BACKGROUND OF THE INVENTION

The process of rendering two-dimensional images from three-dimensional scenes is commonly referred to as image processing. As the modern computer industry evolves image processing evolves as well. One particular goal in the evolution of image processing is to make two-dimensional simulations or renditions of three-dimensional scenes as realistic as possible. One limitation of rendering realistic images is that modern monitors display images through the use of pixels.

A pixel is the smallest area of space which can be illuminated on a monitor. Most modern computer monitors will use a combination of hundreds of thousands or millions of pixels to compose the entire display or rendered scene. The individual pixels are arranged in a grid pattern and collectively cover the entire viewing area of the monitor. Each individual pixel may be illuminated to render a final picture for viewing.

One technique for rendering a real world three-dimensional scene onto a two-dimensional monitor using pixels is called rasterization. Rasterization is the process of taking a two-dimensional image represented in vector format (mathematical representations of geometric objects within a scene) and converting the image into individual pixels for display on the monitor. Other techniques for rendering a real world three-dimensional scene onto a two-dimensional monitor using pixels have been developed based upon more realistic physical modeling. One such physical rendering technique is called ray tracing, which traces the propagation of imaginary rays, rays which behave similar to rays of light, into a three-dimensional scene which is to be rendered onto a computer screen. The rays originate from the eye(s) of a viewer sitting behind the computer screen and traverse through pixels, which make up the computer screen, towards the three-dimensional scene. Each traced ray proceeds into the scene and may intersect with objects within the scene. If a ray intersects an object within the scene, properties of the object and several other contributing factors are used to calculate the amount of color and light, or lack thereof, the ray is exposed to. These calculations are then used to determine the final color of the pixel through which the traced ray passed.

As image resolution and complexity continue to increase, the computational requirements of an image processing system likewise continue to increase. With continued improvements in semiconductor technology in terms of clock speed and an increased use of parallelism; however, rasterization becomes viable for more complex images, and real time rendering of scenes using physical rendering techniques such as ray tracing becomes a more practical alternative to rasterization. At the chip level, multiple processor cores are often disposed on the same chip, functioning in much the same manner as separate processor chips, or to some extent, as completely separate computers. In addition, even within cores, parallelism is employed through the use of multiple execution units that are specialized to handle certain types of operations. Hardware-based pipelining is also employed in many instances so that certain operations that may take multiple clock cycles to perform are broken up into stages, enabling other operations to be started prior to completion of earlier operations. Multithreading is also employed to enable multiple instruction streams to be processed in parallel, enabling more overall work to performed in any given clock cycle.

Irrespective of whether raster-based or physical rendering is performed to render image data for a scene, the increased use of parallelism presents some challenges with respect to maintaining a coherent state in a parallelized, multithreaded architecture. In many conventional multithreaded environments, for example, state data that is shared by multiple hardware-based threads, or threads of execution (as distinguished from time-sliced, software-based multithreading), is typically stored in a shared memory that is accessible by all of the threads of execution. The shared memory, for example, may be implemented using an on-chip DRAM array or using memory devices that are external from any processor chips.

In addition, caching may be used to accelerate the access to the shared state. With caching, one or more levels of smaller, yet faster memory arrays are interposed between the threads of execution and the shared memory to temporarily store copies of data in the shared memory, thereby accelerating the retrieval of data by threads of execution. Some cache memories may be shared by multiple threads of execution, while others, which often offer the lowest latency, may be tightly integrated with and exclusively owned by particular threads of execution.

In conventional caching environments, whenever a thread of execution attempts to access shared data stored in a shared memory, a copy of the shared data is copied into one or more levels of cache memory so that subsequent accesses to the data are made to the cache memory rather than the shared memory. So long as the data is not modified by any thread of execution, multiple copies of the data can be cached by multiple threads of execution. Should the data be modified by any particular thread of execution, a coherence protocol, typically using either a coherence directory or snooping, is typically used to invalidate other copies of the data in other threads of execution. When the other threads attempt to access the data again, the modified data is written back to the shared memory, and in some instances, sent directly from the prior owner of the data to a requesting thread through a process known as intervention.

In highly multithreaded environments incorporating a shared memory, however, propagating changes to state data can be highly inefficient and significantly slow throughput. In many such environments, the interface to the shared memory has a limited bandwidth, and due to the high numbers of threads of execution that may need to use shared data, any changes to that data may result in tens or hundreds of threads attempting to access the same data at the same time, which can cause the interface with the shared memory to become a significant bottleneck, and in some cases, further overload the interface with coherency-related communications as those tens or hundreds of threads attempt to maintain coherency with one another. In addition, shared state data in some instances can be somewhat large, e.g., on the order of several kilobytes of memory, so forwarding complete copies of shared state data can also have a significant adverse impact on communications and memory bandwidth.

Similar problems may also exist in other highly multithreaded environments, including those used in applications other than image processing. A need therefore exists in the art for an improved manner of maintaining coherent state data in highly multithreaded environments.

SUMMARY OF THE INVENTION

The invention addresses these and other problems associated with the prior art by providing a circuit arrangement and method in which state changes to shared state data in a highly multithreaded environment are made by propagating or streaming the changes to multiple parallel hardware threads of execution in the multithreaded environment using an on-chip communications network and without attempting to access any copy of the shared state data in a shared memory to which the parallel threads of execution are also coupled. Through the use of an on-chip communications network, changes to the shared state may be communicated quickly and efficiently to multiple threads of execution, enabling those threads to locally update their local copies of the shared state. Furthermore, by avoiding attempts to access a shared memory, the interface to the shared memory is not overloaded with concurrent access attempts, thus preserving memory bandwidth for other activities and reducing memory latency. Particularly for larger shared states, propagating only the changes, rather than the entire shared state, further improves performance by reducing the amount of data communicated over the on-chip communications network.

Therefore, consistent with one aspect of the invention, a circuit arrangement and method communicate state changes to a shared state that is locally cached by at least a subset of parallel threads of execution from among a plurality of parallel threads of execution resident in multithreaded hardware logic and that is additionally stored in a shared memory accessible via a memory interface. Changes to the shared state are propagated to multiple parallel threads of execution through an on-chip communications network that couples together the plurality of parallel threads of execution without attempting to access the copy of the shared state in the shared memory.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIG. 7 is a block diagram of a processing unit including an exemplary multithreaded rendering pipeline incorporating network-based streaming of shared state changes consistent with the invention.

FIG. 9 is a diagram of an exemplary implementation of the shared state referenced in FIG. 8.

FIG. 10 is a diagram of an exemplary implementation of a state change packet capable of updating the shared state in the NOC of FIG. 8.

DETAILED DESCRIPTION

Figure 1:
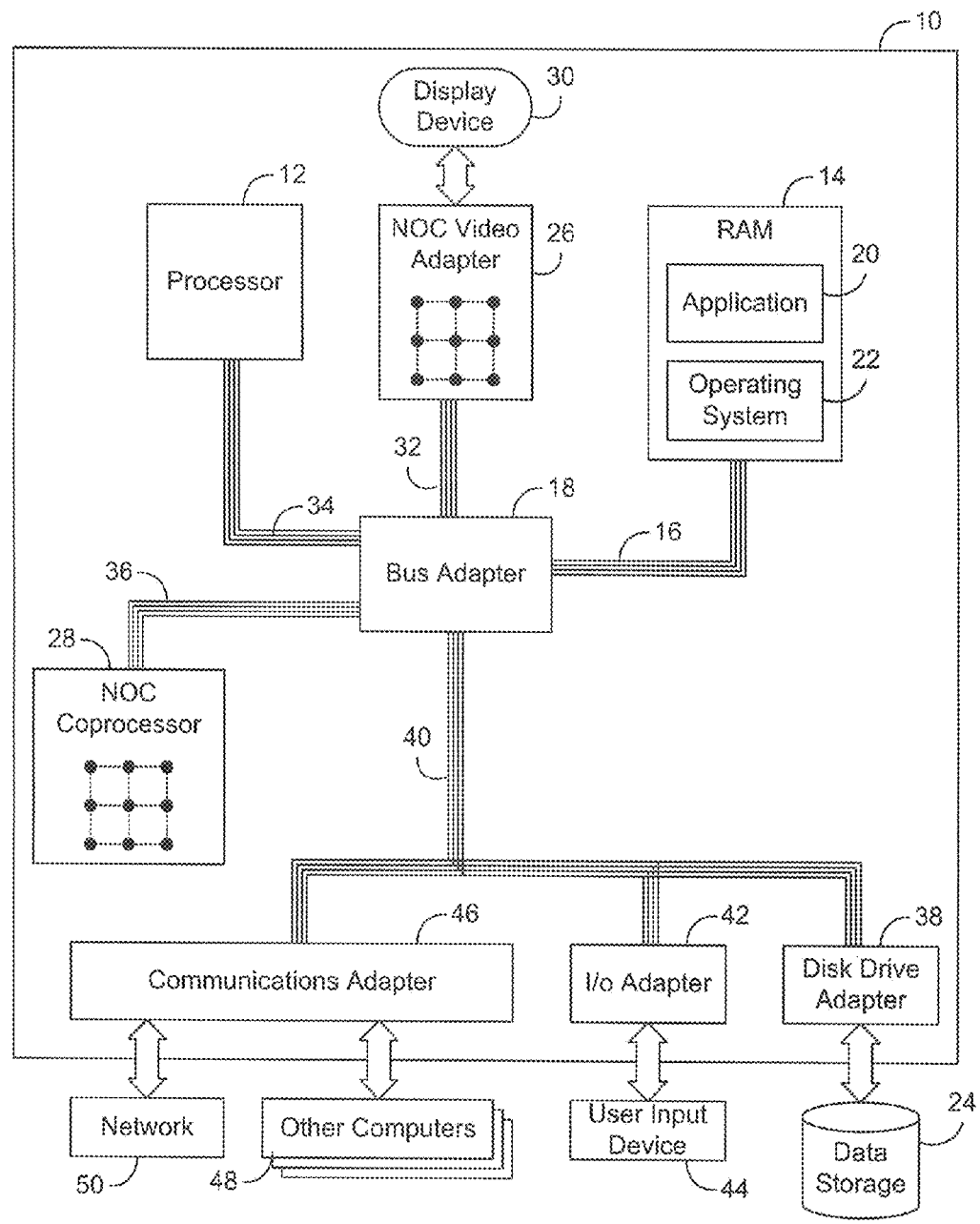
FIG. 1 is a block diagram of exemplary automated computing machinery including an exemplary computer useful in data processing consistent with embodiments of the present invention.

Embodiments consistent with the invention improve the performance of a highly multithreaded environment by updating a shared state in a highly multithreaded environment by propagating or streaming changes to the shared state to multiple parallel hardware threads of execution in the multithreaded environment using an on-chip communications network and without attempting to access any copy of the shared state data in a shared memory to which the parallel threads of execution are also coupled.

A highly multithreaded environment, in this context, refers to a hardware environment in which a relatively large number of parallel threads of execution, e.g., eight or more threads, disposed on the same integrated circuit device, or chip, are interconnected with one another via an on-chip communications network. A parallel thread of execution is a thread within the context of hardware-based multithreading, as opposed to software-based (time slice) multithreading, although it will be appreciated that software-based multithreading may be used in connection with hardware-based multithreading. Parallel threads of execution may be implemented within one or more processing cores disposed on a chip, and an individual processing core may implement one or more hardware-based threads.

An on-chip communications network may be implemented in a number of manners consistent with the invention. In the illustrated embodiments, for example, a network on chip architecture is used where multiple processing cores are coupled to a packet-based network. Other network architectures, however, may be used in other embodiments.

A shared memory, in this context, typically refers to a type of memory that is accessible to the parallel threads of execution, either at least partially over the on-chip communications network or via a completely separate memory interface, and that stores state data, e.g., global state data, that is shared by the plurality of parallel threads of execution. In this regard, the copy of the shared data stored in the shared memory may be considered to be a master copy of the shared data. Individual parallel threads of execution, or groups of such threads of execution, however, maintain locally cached copies of the state data to accelerate access to such data, typically by avoiding the need to access the shared memory through the on-chip network and/or a memory interface.

Consistent with the invention, whenever the shared state data changes, rather than synchronizing the locally cached copies of the shared state data with the copy of the shared state data in the shared memory, changes to the shared state are propagated to the parallel threads of execution over the on-chip communications network, and without attempting to access the shared memory, enabling the threads of execution to locally update their own copies of the state data based upon the contents of the propagated changes. By propagating only the changes, rather than a complete updated copy of the state data, the volume of data communicated over the on-chip network is reduced. Furthermore, if broadcast-type and/or multicast-type messaging is supported in the on-chip network, a reduced number of communications may be used to propagate the changes to large numbers of threads of execution.

In addition, by propagating the changes over the on-chip network and without attempting to access the shared memory or otherwise synchronize with the copy of the shared state in the shared memory in connection with the propagation, the memory interface to the shared memory is not overloaded with concurrent access attempts, thus preserving memory bandwidth for other activities and reducing memory latency.

Shared state data, consistent with the invention, may represent practically any data, or even program code instructions, that are shared by multiple threads of execution. In an image processing application, for example, shared state data may be information regarding color changes, rendering mode, shader mode, z-buffer test mode, etc. In one embodiment, for example, shared state data may include a render context, e.g., as disclosed in U.S. patent application Ser. No. 12/046,573, published as U.S. Pub. No. 2009/0231349, and assigned to the same assignee as the instant application, which is incorporated by reference herein. It has been found that render contexts may include a substantial amount of data, e.g., two or more kilobytes, so propagating changes to such contexts (which might include changes to only a few bytes) rather than the entire contexts, would substantially decrease the volume of data communicated to update the locally cached copies of the shared state data.

In other applications, shared state data may include information such as data ownership information (e.g., for cache management purposes), as well as algorithm mode. Shared state data, as noted above, may even include executable instructions, such that propagation may be used to efficiently update program code executed by multiple parallel threads of execution, thus effectively reprogramming the threads of execution.

The changes propagated to threads of execution may also take various forms consistent with the invention. For example, changes may be passed in change packets, and may include, for example, additions or deletions from the shared state, modifications to the shared state, etc. A change, for example, may be as simple as a new value to be stored for a parameter in the shared state. Change packets may include information alerting a thread of execution how to change its locally cached copy of the shared state, e.g., via an index or offset into the shared state, a delta value, or a change code (e.g., instructing a thread to remove a range of data, copy a change of data, etc.). A change packet may also include a function pointer, or actual instructions, that a thread may execute in order to implement the change to the state data.

Other variations and modifications will be apparent to one of ordinary skill in the art. Therefore, the invention is not limited to the specific implementations discussed herein.

Hardware and Software Environment

Now turning to the drawings, wherein like numbers denote like parts throughout the several views, FIG. 1 illustrates exemplary automated computing machinery including an exemplary computer 10 useful in data processing consistent with embodiments of the present invention. Computer 10 of FIG. 1 includes at least one computer processor 12 or 'CPU' as well as random access memory 14 ('RAM'), which is connected through a high speed memory bus 16 and bus adapter 18 to processor 12 and to other components of the computer 10.

Stored in RAM 14 is an application program 20, a module of user-level computer program instructions for carrying out particular data processing tasks such as, for example, word processing, spreadsheets, database operations, video gaming, stock market simulations, atomic quantum process simulations, or other user-level applications. Also stored in RAM 14 is an operating system 22. Operating systems useful in connection with embodiments of the invention include UNIX™, Linux™ Microsoft Windows XP™, AIX™, IBM's i5/OS™, and others as will occur to those of skill in the art. Operating system 22 and application 20 in the example of FIG. 1 are shown in RAM 14, but many components of such software typically are stored in non-volatile memory also, e.g., on a disk drive 24.

As will become more apparent below, embodiments consistent with the invention may be implemented within Network On Chip (NOC) integrated circuit devices, or chips, and as such, computer 10 is illustrated including two exemplary NOCs: a video adapter 26 and a coprocessor 28. NOC video adapter 26, which may alternatively be referred to as a graphics adapter, is an example of an I/O adapter specially designed for graphic output to a display device 30 such as a display screen or computer monitor. NOC video adapter 26 is connected to processor 12 through a high speed video bus 32, bus adapter 18, and the front side bus 34, which is also a high speed bus. NOC Coprocessor 28 is connected to processor 12 through bus adapter 18, and front side buses 34 and 36, which is also a high speed bus. The NOC coprocessor of FIG. 1 may be optimized, for example, to accelerate particular data processing tasks at the behest of the main processor 12.

The exemplary NOC video adapter 26 and NOC coprocessor 28 of FIG. 1 each include a NOC, including integrated processor ('IP') blocks, routers, memory communications controllers, and network interface controllers, the details of which will be discussed in greater detail below in connection with FIGS. 2-3. The NOC video adapter and NOC coprocessor are each optimized for programs that use parallel processing and also require fast random access to shared memory. It will be appreciated by one of ordinary skill in the art having the benefit of the instant disclosure, however, that the invention may be implemented in devices and device architectures other than NOC devices and device architectures. The invention is therefore not limited to implementation within an NOC device.

Computer 10 of FIG. 1 includes disk drive adapter 38 coupled through an expansion bus 40 and bus adapter 18 to processor 12 and other components of the computer 10. Disk drive adapter 38 connects non-volatile data storage to the computer 10 in the form of disk drive 24, and may be implemented, for example, using Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

Computer 10 also includes one or more input/output ('I/O') adapters 42, which implement user-oriented input/output through, for example, software drivers and computer hardware for controlling output to display devices such as computer display screens, as well as user input from user input devices 44 such as keyboards and mice. In addition, computer 10 includes a communications adapter 46 for data communications with other computers 48 and for data communications with a data communications network 50. Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters suitable for use in computer 10 include modems for wired dial-up communications, Ethernet (IEEE 802.3) adapters for wired data communications network communications, and 802.11 adapters for wireless data communications network communications.

Figure 2:
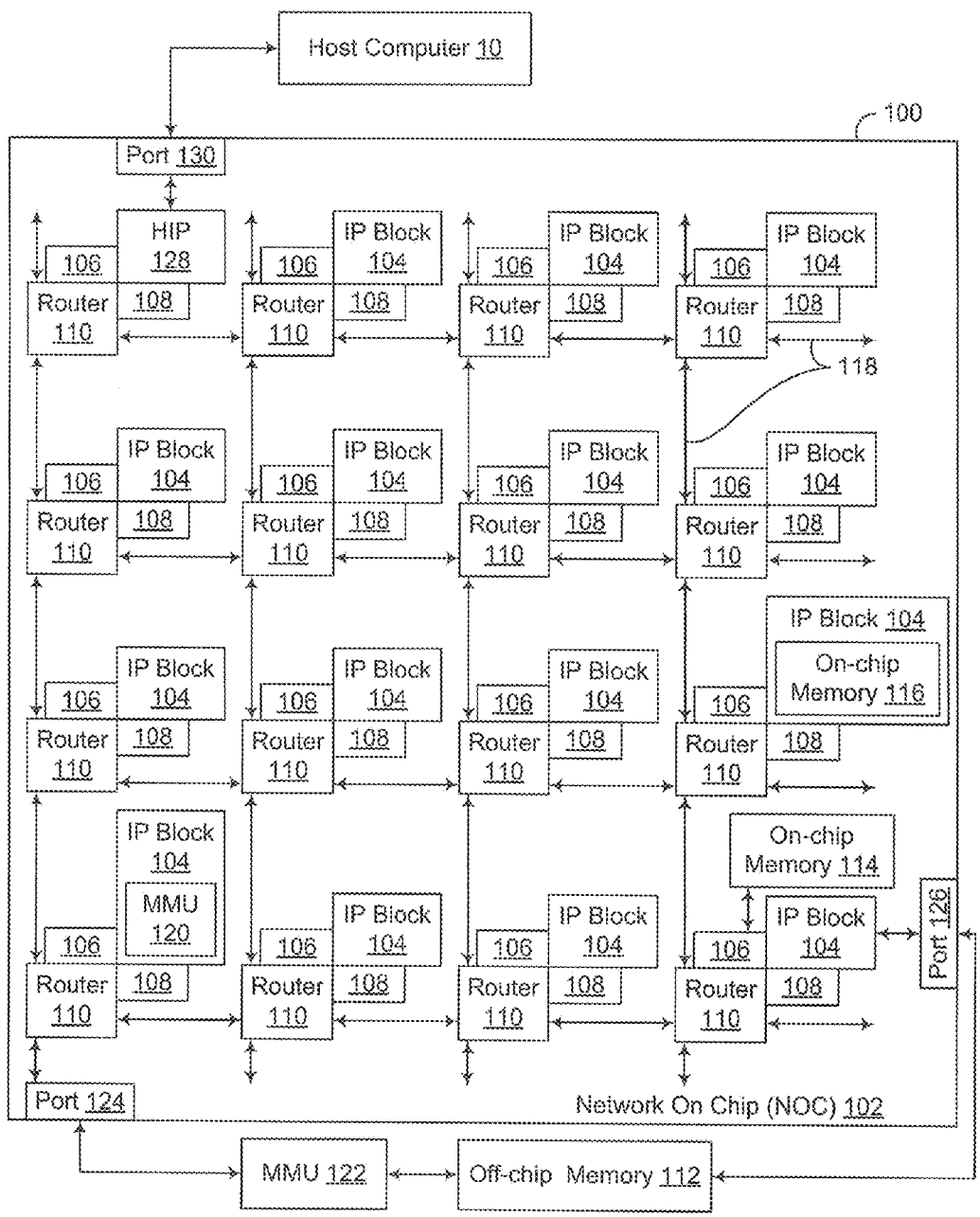
FIG. 2 is a block diagram of an exemplary NOC implemented in the computer of FIG. 1.

For further explanation, FIG. 2 sets forth a functional block diagram of an example NOC 102 according to embodiments of the present invention. The NOC in FIG. 2 is implemented on a 'chip' 100, that is, on an integrated circuit. NOC 102 includes integrated processor ('IP') blocks 104, routers 110, memory communications controllers 106, and network interface controllers 108 grouped into interconnected nodes. Each IP block 104 is adapted to a router 110 through a memory communications controller 106 and a network interface controller 108. Each memory communications controller controls communications between an IP block and memory, and each network interface controller 108 controls inter-IP block communications through routers 110.

In NOC 102, each IP block represents a reusable unit of synchronous or asynchronous logic design used as a building block for data processing within the NOC. The term 'IP block' is sometimes expanded as 'intellectual property block,' effectively designating an IP block as a design that is owned by a party, that is the intellectual property of a party, to be licensed to other users or designers of semiconductor circuits. In the scope of the present invention, however, there is no requirement that IP blocks be subject to any particular ownership, so the term is always expanded in this specification as 'integrated processor block.' IP blocks, as specified here, are reusable units of logic, cell, or chip layout design that may or may not be the subject of intellectual property. IP blocks are logic cores that can be formed as ASIC chip designs or FPGA logic designs.

One way to describe IP blocks by analogy is that IP blocks are for NOC design what a library is for computer programming or a discrete integrated circuit component is for printed circuit board design. In NOCs consistent with embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHDL. In addition to netlist and synthesizable implementation, NOCs also may be delivered in lower-level, physical descriptions. Analog IP block elements such as SERDES, PLL, DAC, ADC, and so on, may be distributed in a transistor-layout format such as GDSII. Digital elements of IP blocks are sometimes offered in layout format as well. It will also be appreciated that IP blocks, as well as other logic circuitry implemented consistent with the invention may be distributed in the form of computer data files, e.g., logic definition program code, that define at various levels of detail the functionality and/or layout of the circuit arrangements implementing such logic. Thus, while the invention has and hereinafter will be described in the context of circuit arrangements implemented in fully functioning integrated circuit devices and data processing systems utilizing such devices, those of ordinary skill in the art having the benefit of the instant disclosure will appreciate that circuit arrangements consistent with the invention are capable of being distributed as program products in a variety of forms, and that the invention applies equally regardless of the particular type of computer readable or signal bearing media being used to actually carry out the distribution. Examples of computer readable or signal bearing media include, but are not limited to, non-transitory, physical, recordable type media such as volatile and non-volatile memory devices, floppy disks, hard disk drives, CD-ROMs, and DVDs (among others).

Each IP block 104 in the example of FIG. 2 is adapted to a router 110 through a memory communications controller 106. Each memory communication controller is an aggregation of synchronous and asynchronous logic circuitry adapted to provide data communications between an IP block and memory. Examples of such communications between IP blocks and memory include memory load instructions and memory store instructions. The memory communications controllers 106 are described in more detail below with reference to FIG. 3. Each IP block 104 is also adapted to a router 110 through a network interface controller 108, which controls communications through routers 110 between IP blocks 104. Examples of communications between IP blocks include messages carrying data and instructions for processing the data among IP blocks in parallel applications and in pipelined applications. The network interface controllers 108 are also described in more detail below with reference to FIG. 3.

Routers 110, and the corresponding links 118 therebetween, implement the network operations of the NOC. The links 118 may be packet structures implemented on physical, parallel wire buses connecting all the routers. That is, each link may be implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wide, 512 wires. In addition, each link may be bi-directional, so that if the link packet structure includes 64 bytes, the wire bus actually contains 1024 wires between each router and each of its neighbors in the network. In such an implementation, a message could include more than one packet, but each packet would fit precisely onto the width of the wire bus. In the alternative, a link may be implemented on a wire bus that is only wide enough to accommodate a portion of a packet, such that a packet would be broken up into multiple beats, e.g., so that if a link is implemented as 16 bytes in width, or 128 wires, a 64 byte packet could be broken into four beats. It will be appreciated that different implementations may used different bus widths based on practical physical limits as well as desired performance characteristics. If the connection between the router and each section of wire bus is referred to as a port, then each router includes five ports, one for each of four directions of data transmission on the network and a fifth port for adapting the router to a particular IP block through a memory communications controller and a network interface controller.

Each memory communications controller 106 controls communications between an IP block and memory. Memory can include off-chip main RAM 112, memory 114 connected directly to an IP block through a memory communications controller 106, on-chip memory enabled as an IP block 116, and on-chip caches. In NOC 102, either of the on-chip memories 114, 116, for example, may be implemented as on-chip cache memory. All these forms of memory can be disposed in the same address space, physical addresses or virtual addresses, true even for the memory attached directly to an IP block. Memory addressed messages therefore can be entirely bidirectional with respect to IP blocks, because such memory can be addressed directly from any IP block anywhere on the network. Memory 116 on an IP block can be addressed from that IP block or from any other IP block in the NOC. Memory 114 attached directly to a memory communication controller can be addressed by the IP block that is adapted to the network by that memory communication controller—and can also be addressed from any other IP block anywhere in the NOC.

NOC 102 includes two memory management units ('MMUs') 120, 122, illustrating two alternative memory architectures for NOCs consistent with embodiments of the present invention. MMU 120 is implemented within an IP block, allowing a processor within the IP block to operate in virtual memory while allowing the entire remaining architecture of the NOC to operate in a physical memory address space. MMU 122 is implemented off-chip, connected to the NOC through a data communications port 124. The port 124 includes the pins and other interconnections required to conduct signals between the NOC and the MMU, as well as sufficient intelligence to convert message packets from the NOC packet format to the bus format required by the external MMU 122. The external location of the MMU means that all processors in all IP blocks of the NOC can operate in virtual memory address space, with all conversions to physical addresses of the off-chip memory handled by the off-chip MMU 122.

In addition to the two memory architectures illustrated by use of the MMUs 120, 122, data communications port 126 illustrates a third memory architecture useful in NOCs capable of being utilized in embodiments of the present invention. Port 126 provides a direct connection between an IP block 104 of the NOC 102 and off-chip memory 112. With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port 126. The port 126 includes the pins and other interconnections required to conduct signals between the NOC and the off-chip memory 112, as well as sufficient intelligence to convert message packets from the NOC packet format to the bus format required by the off-chip memory 112.

In the example of FIG. 2, one of the IP blocks is designated a host interface processor 128. A host interface processor 128 provides an interface between the NOC and a host computer 10 in which the NOC may be installed and also provides data processing services to the other IP blocks on the NOC, including, for example, receiving and dispatching among the IP blocks of the NOC data processing requests from the host computer. A NOC may, for example, implement a video graphics adapter 26 or a coprocessor 28 on a larger computer 10 as described above with reference to FIG. 1. In the example of FIG. 2, the host interface processor 128 is connected to the larger host computer through a data communications port 130. The port 130 includes the pins and other interconnections required to conduct signals between the NOC and the host computer, as well as sufficient intelligence to convert message packets from the NOC to the bus format required by the host computer 10. In the example of the NOC coprocessor in the computer of FIG. 1, such a port would provide data communications format translation between the link structure of the NOC coprocessor 28 and the protocol required for the front side bus 36 between the NOC coprocessor 28 and the bus adapter 18.

Figure 3:
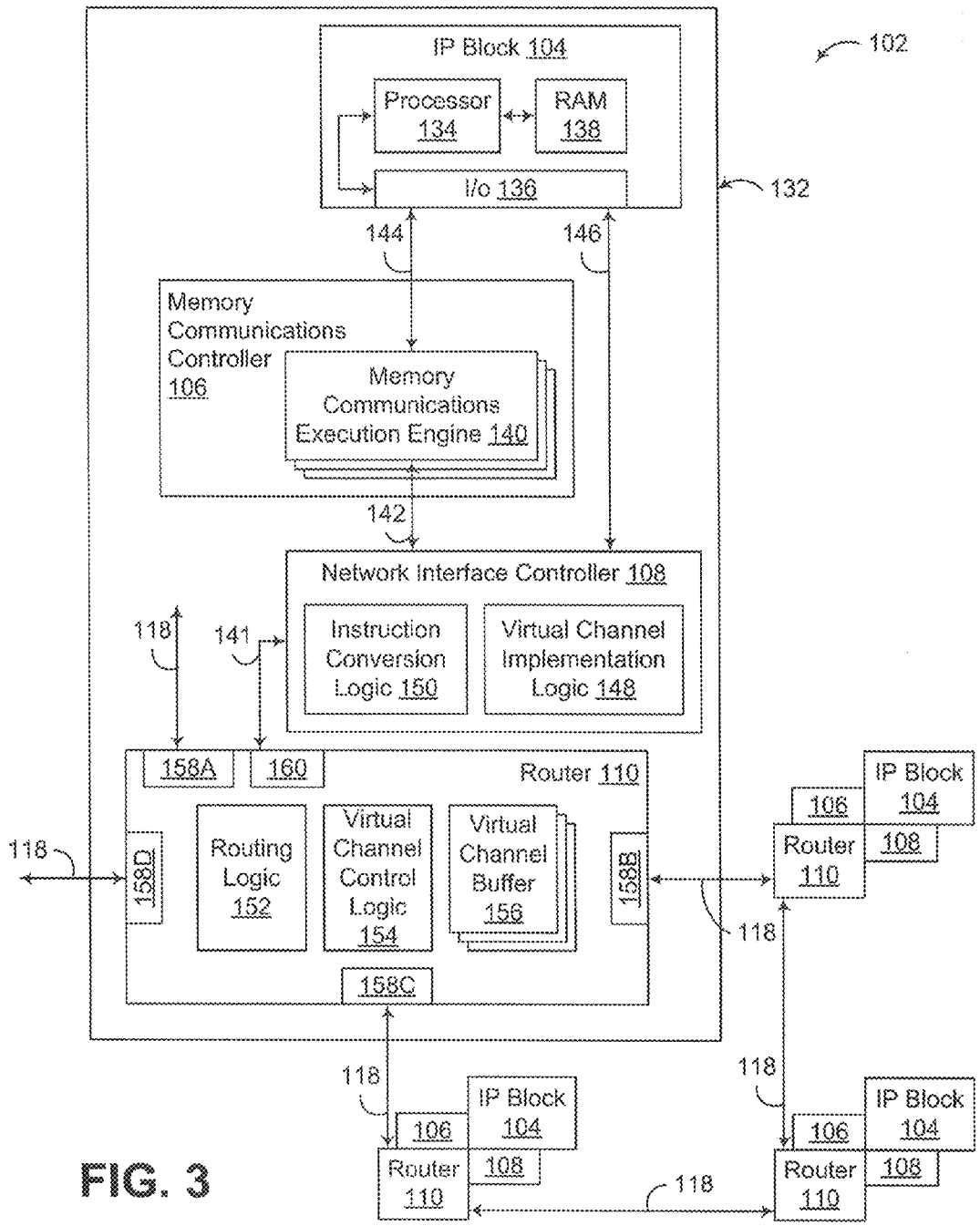
FIG. 3 is a block diagram illustrating in greater detail an exemplary implementation of a node from the NOC of FIG. 2.

FIG. 3 next illustrates a functional block diagram illustrating in greater detail the components implemented within an IP block 104, memory communications controller 106, network interface controller 108 and router 110 in NOC 102, collectively illustrated at 132. IP block 104 includes a computer processor 134 and I/O functionality 136. In this example, computer memory is represented by a segment of random access memory ('RAM') 138 in IP block 104. The memory, as described above with reference to FIG. 2, can occupy segments of a physical address space whose contents on each IP block are addressable and accessible from any IP block in the NOC. The processors 134, I/O capabilities 136, and memory 138 in each IP block effectively implement the IP blocks as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

In NOC 102 of FIG. 3, each memory communications controller 106 includes a plurality of memory communications execution engines 140. Each memory communications execution engine 140 is enabled to execute memory communications instructions from an IP block 104, including bidirectional memory communications instruction flow 141, 142, 144 between the network and the IP block 104. The memory communications instructions executed by the memory communications controller may originate, not only from the IP block adapted to a router through a particular memory communications controller, but also from any IP block 104 anywhere in NOC 102. That is, any IP block in the NOC can generate a memory communications instruction and transmit that memory communications instruction through the routers of the NOC to another memory communications controller associated with another IP block for execution of that memory communications instruction. Such memory communications instructions can include, for example, translation lookaside buffer control instructions, cache control instructions, barrier instructions, and memory load and store instructions.

Each memory communications execution engine 140 is enabled to execute a complete memory communications instruction separately and in parallel with other memory communications execution engines. The memory communications execution engines implement a scalable memory transaction processor optimized for concurrent throughput of memory communications instructions. Memory communications controller 106 supports multiple memory communications execution engines 140 all of which run concurrently for simultaneous execution of multiple memory communications instructions. A new memory communications instruction is allocated by the memory communications controller 106 to a memory communications engine 140 and memory communications execution engines 140 can accept multiple response events simultaneously. In this example, all of the memory communications execution engines 140 are identical. Scaling the number of memory communications instructions that can be handled simultaneously by a memory communications controller 106, therefore, is implemented by scaling the number of memory communications execution engines 140.

In NOC 102 of FIG. 3, each network interface controller 108 is enabled to convert communications instructions from command format to network packet format for transmission among the IP blocks 104 through routers 110. The communications instructions may be formulated in command format by the IP block 104 or by memory communications controller 106 and provided to the network interface controller 108 in command format. The command format may be a native format that conforms to architectural register files of IP block 104 and memory communications controller 106. The network packet format is typically the format required for transmission through routers 110 of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In NOC 102 of FIG. 3, each IP block is enabled to send memory-address-based communications to and from memory through the IP block's memory communications controller and then also through its network interface controller to the network. A memory-address-based communications is a memory access instruction, such as a load instruction or a store instruction, that is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. Thus, in NOC 102, all memory-address-based communications that are executed with message traffic are passed from the memory communications controller to an associated network interface controller for conversion from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller 106 is naturally also the network location of that memory communication controller's associated router 110, network interface controller 108, and IP block 104. The instruction conversion logic 150 within each network interface controller is capable of converting memory addresses to network addresses for purposes of transmitting memory-address-based communications through routers of a NOC.

Upon receiving message traffic from routers 110 of the network, each network interface controller 108 inspects each packet for memory instructions. Each packet containing a memory instruction is handed to the memory communications controller 106 associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

In NOC 102 of FIG. 3, each IP block 104 is enabled to bypass its memory communications controller 106 and send inter-IP block, network-addressed communications 146 directly to the network through the IP block's network interface controller 108. Network-addressed communications are messages directed by a network address to another IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through I/O functions 136 directly to the IP block's network interface controller in command format, then converted to packet format by the network interface controller and transmitted through routers of the NOC to another IP block. Such network-addressed communications 146 are bi-directional, potentially proceeding to and from each IP block of the NOC, depending on their use in any particular application. Each network interface controller, however, is enabled to both send and receive such communications to and from an associated router, and each network interface controller is enabled to both send and receive such communications directly to and from an associated IP block, bypassing an associated memory communications controller 106.

Each network interface controller 108 in the example of FIG. 3 is also enabled to implement virtual channels on the network, characterizing network packets by type. Each network interface controller 108 includes virtual channel implementation logic 148 that classifies each communication instruction by type and records the type of instruction in a field of the network packet format before handing off the instruction in packet form to a router 110 for transmission on the NOC. Examples of communication instruction types include inter-IP block network-address-based messages, request messages, responses to request messages, invalidate messages directed to caches; memory load and store messages; and responses to memory load messages, etc.

Each router 110 in the example of FIG. 3 includes routing logic 152, virtual channel control logic 154, and virtual channel buffers 156. The routing logic typically is implemented as a network of synchronous and asynchronous logic that implements a data communications protocol stack for data communication in the network formed by the routers 110, links 118, and bus wires among the routers. Routing logic 152 includes the functionality that readers of skill in the art might associate in off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed.

In describing memory-address-based communications above, each memory address was described as mapped by network interface controllers to a network address, a network location of a memory communications controller. The network location of a memory communication controller 106 is naturally also the network location of that memory communication controller's associated router 110, network interface controller 108, and IP block 104. In inter-IP block, or network-address-based communications, therefore, it is also typical for application-level data processing to view network addresses as the location of an IP block within the network formed by the routers, links, and bus wires of the NOC. FIG. 2 illustrates that one organization of such a network is a mesh of rows and columns in which each network address can be implemented, for example, as either a unique identifier for each set of associated router, IP block, memory communications controller, and network interface controller of the mesh or x, y coordinates of each such set in the mesh.

In NOC 102 of FIG. 3, each router 110 implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches; memory load and store messages; and responses to memory load messages, and so on. In support of virtual channels, each router 110 in the example of FIG. 3 also includes virtual channel control logic 154 and virtual channel buffers 156. The virtual channel control logic 154 examines each received packet for its assigned communications type and places each packet in an outgoing virtual channel buffer for that communications type for transmission through a port to a neighboring router on the NOC.

Each virtual channel buffer 156 has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer 156 in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected—and can continue to operate at full capacity. The control signals are wired all the way back through each router to each router's associated network interface controller 108. Each network interface controller is configured to, upon receipt of such a signal, refuse to accept, from its associated memory communications controller 106 or from its associated IP block 104, communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped. When a router encounters a situation in which a packet might be dropped in some unreliable protocol such as, for example, the Internet Protocol, the routers in the example of FIG. 3 may suspend by their virtual channel buffers 156 and their virtual channel control logic 154 all transmissions of packets in a virtual channel until buffer space is again available, eliminating any need to drop packets. The NOC of FIG. 3, therefore, may implement highly reliable network communications protocols with an extremely thin layer of hardware.

The example NOC of FIG. 3 may also be configured to maintain cache coherency between both on-chip and off-chip memory caches. Each NOC can support multiple caches each of which operates against the same underlying memory address space. For example, caches may be controlled by IP blocks, by memory communications controllers, or by cache controllers external to the NOC. Either of the on-chip memories 114, 116 in the example of FIG. 2 may also be implemented as an on-chip cache, and, within the scope of the present invention, cache memory can be implemented off-chip also.

Each router 110 illustrated in FIG. 3 includes five ports, four ports 158A-D connected through bus wires 118 to other routers and a fifth port 160 connecting each router to its associated IP block 104 through a network interface controller 108 and a memory communications controller 106. As can be seen from the illustrations in FIGS. 2 and 3, the routers 110 and the links 118 of the NOC 102 form a mesh network with vertical and horizontal links connecting vertical and horizontal ports in each router. In the illustration of FIG. 3, for example, ports 158A, 158C and 160 are termed vertical ports, and ports 158B and 158D are termed horizontal ports.

Figure 4:
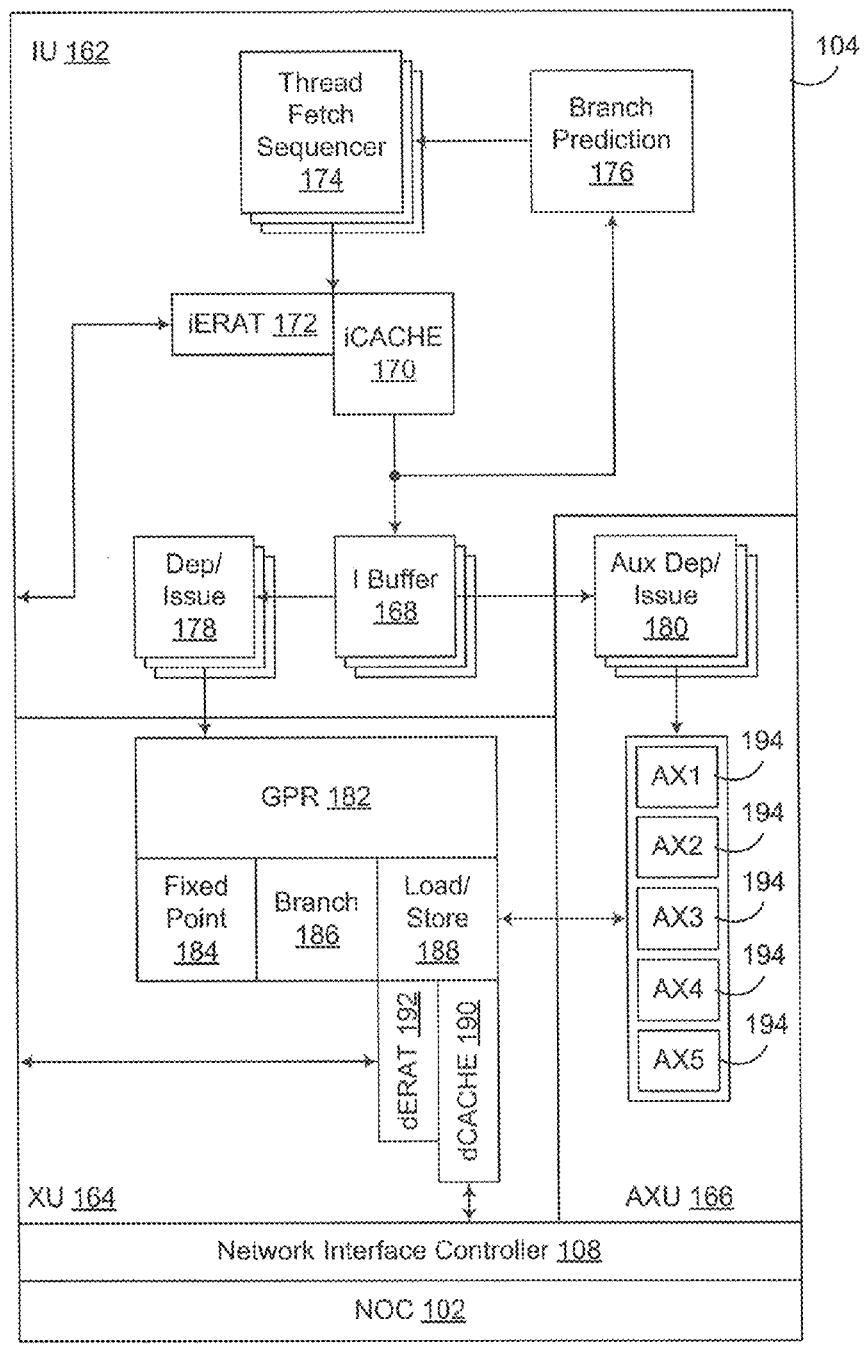
FIG. 4 is a block diagram illustrating an exemplary implementation of an IP block from the NOC of FIG. 2.

FIG. 4 next illustrates in another manner one exemplary implementation of an IP block 104 consistent with the invention, implemented as a processing element partitioned into an instruction unit (IU) 162, execution unit (XU) 164 and auxiliary execution unit (AXU) 166. In the illustrated implementation, IU 162 includes a plurality of instruction buffers 168 that receive instructions from an L1 instruction cache (iCACHE) 170. Each instruction buffer 168 is dedicated to one of a plurality, e.g., four, symmetric multithreaded (SMT) hardware threads. An effective-to-real translation unit (iERAT) 172 is coupled to iCACHE 170, and is used to translate instruction fetch requests from a plurality of thread fetch sequencers 174 into real addresses for retrieval of instructions from lower order memory. Each thread fetch sequencer 174 is dedicated to a particular hardware thread, and is used to ensure that instructions to be executed by the associated thread is fetched into the iCACHE for dispatch to the appropriate execution unit. As also shown in FIG. 4, instructions fetched into instruction buffer 168 may also be monitored by branch prediction logic 176, which provides hints to each thread fetch sequencer 174 to minimize instruction cache misses resulting from branches in executing threads.

IU 162 also includes a dependency/issue logic block 178 dedicated to each hardware thread, and configured to resolve dependencies and control the issue of instructions from instruction buffer 168 to XU 164. In addition, in the illustrated embodiment, separate dependency/issue logic 180 is provided in AXU 166, thus enabling separate instructions to be concurrently issued by different threads to XU 164 and AXU 166. In an alternative embodiment, logic 180 may be disposed in IU 162, or may be omitted in its entirety, such that logic 178 issues instructions to AXU 166.

XU 164 is implemented as a fixed point execution unit, including a set of general purpose registers (GPR's) 182 coupled to fixed point logic 184, branch logic 186 and load/store logic 188. Load/store logic 188 is coupled to an L1 data cache (dCACHE) 190, with effective to real translation provided by dERAT logic 192. XU 164 may be configured to implement practically any instruction set, e.g., all or a portion of a 32b or 64b PowerPC instruction set.

AXU 166 operates as an auxiliary execution unit including dedicated dependency/issue logic 180 along with one or more execution blocks 194. AXU 166 may include any number of execution blocks, and may implement practically any type of execution unit, e.g., a floating point unit, or one or more specialized execution units such as encryption/decryption units, coprocessors, vector processing units, graphics processing units, XML processing units, etc. In the illustrated embodiment, AXU 166 includes a high speed auxiliary interface to XU 164, e.g., to support direct moves between AXU architected state and XU architected state.

Communication with IP block 104 may be managed in the manner discussed above in connection with FIG. 2, via network interface controller 108 coupled to NOC 102. Address-based communication, e.g., to access L2 cache memory, may be provided, along with message-based communication. For example, each IP block 104 may include a dedicated in box and/or out box in order to handle inter-node communications between IP blocks.

Embodiments of the present invention may be implemented within the hardware and software environment described above in connection with FIGS. 1-4. However, it will be appreciated by one of ordinary skill in the art having the benefit of the instant disclosure that the invention may be implemented in a multitude of different environments, and that other modifications may be made to the aforementioned hardware and software embodiment without departing from the spirit and scope of the invention. As such, the invention is not limited to the particular hardware and software environment disclosed herein.

Software Pipelining

Figure 5:
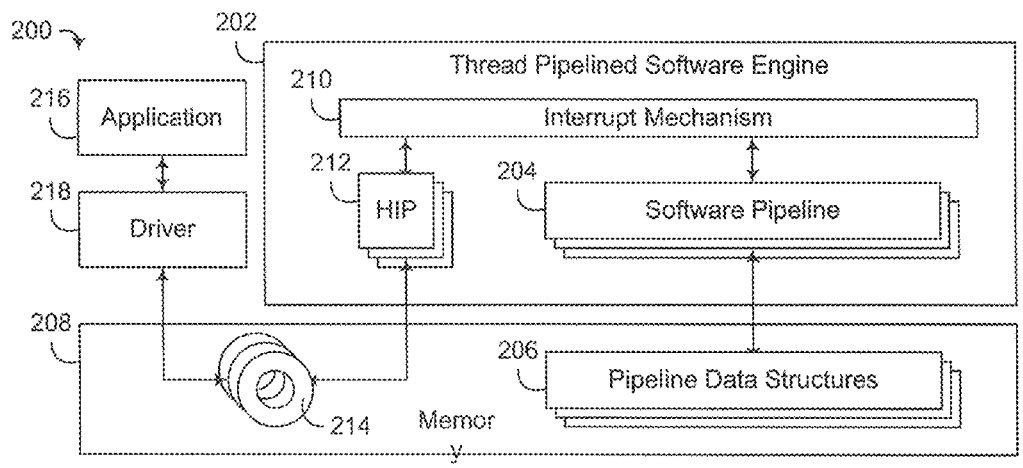
FIG. 5 is a block diagram of a thread pipelined software engine suitable for implementation in the NOC of FIG. 2.

Turning now to FIG. 5, NOC 102 may be used in some embodiments to implement a software-based pipeline. In particular, FIG. 5 illustrates an exemplary processing unit 200 incorporating a thread pipelined software engine 202 that may be used to implement and execute one or more software pipelines 204 on top of an NOC architecture. Each pipeline 204 is typically allocated one or more data structures 206 in a shared memory 208 to enable different stages of a pipeline to exchange data. Furthermore, an interrupt mechanism 210 is provided to enable stages of a pipeline to notify one another of pending work to be performed.

One or more host interface processors (HIP's) 212 are also provided in engine 202 to handle the issue of work to software pipelines 204. One or more push buffers 214 are provided to interface each HIP 212 with a software application 216 and driver 218, which are resident outside of the engine. In order to initiate work in a pipeline, a software application 216 issues requests through an appropriate driver 218 in the form of API calls, which then generates appropriate requests for the HIP and stores the requests in a push buffer 214. The HIP 212 for the relevant pipeline pulls work requests off of push buffer 214 and initiates processing of the request by the associated pipeline.

In the illustrated embodiment, and as implemented on a NOC 102, a software pipeline 204 implements a function that is segmented into a set of modules or 'stages' of computer program instructions that cooperate with one another to carry out a series of data processing tasks in sequence. Each stage in a pipeline is composed of a flexibly configurable module of computer program instructions identified by a stage 1D with each stage executing on a thread of execution on an IP block 104 of a NOC 102. The stages are flexibly configurable in that each stage may support multiple instances of the stage, so that a pipeline may be scaled by instantiating additional instances of a stage as needed depending on workload. Because each stage is implemented by computer program instructions executing on an IP block 104 of a NOC 102, each stage is capable of accessing addressed memory through a memory communications controller 106. At least one stage, moreover, is capable of sending network-address based communications among other stages, where the network-address based communications maintain packet order.

The network-address based communications, for example, may be implemented using "inboxes" in each stage that receive data and/or commands from preceding stages in the pipeline. The network-address based communications maintain packet order, and are communications of a same type which are able to flow through the same virtual channel as described above. Each packet in such communications is routed by a router 110 in the manner described above, entering and leaving a virtual channel buffer in sequence, in FIFO order, thereby maintaining strict packet order and preserving message integrity.

Each stage implements a producer/consumer relationship with a next stage. The first stage receives work instructions and work piece data through a HIP 212, carries out its designated data processing tasks on the work piece, produces output data, and sends the produced output data to the next stage in the pipeline, which consumes the produced output data from the first stage by carrying out its designated data processing tasks on the produced output data from the first stage, thereby producing output data that is subsequently sent on to a next stage in the pipeline. This sequence of operations continues to the last stage of the pipeline, which then stores its produced output data in an output data structure for eventual return through the HIP 212 to the originating application 216.

Figure 6:
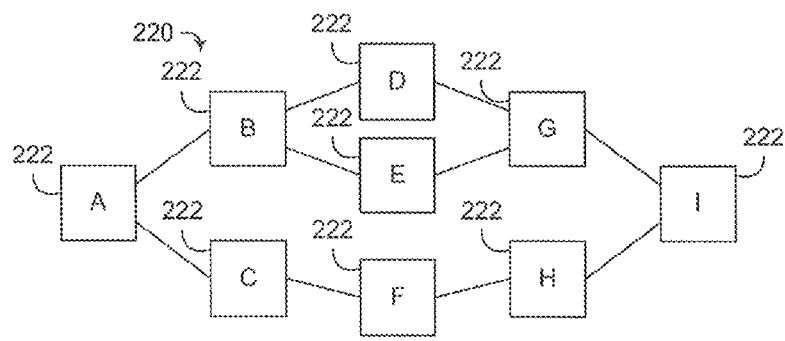
FIG. 6 is a block diagram of an exemplary software pipeline suitable for implementation in the thread pipelined software engine of FIG. 5.

The arrangement of stages in a pipeline may vary in different embodiments, as well as for performing different functions in different applications. FIG. 6, for example, illustrates an exemplary software pipeline 220 including a plurality of stage instances 222, also separately designated as instances A-I, each of which representing a thread of execution implemented on an IP block in NOC 102. The stage instances 222 are arranged in pipeline 220 into five stages, a first stage with instance A, a second stage with instances B and C, a third stage with instances D, E and F, a fourth stage with instances G and H, and a fifth stage with instance I. As can be seen from FIG. 6, instances may have a one-to-one, a one-to-many and/or a many-to-one relationship with other instances in the pipeline. Instances may operate collectively with one another in a particular stage to perform parallel tasks and share the workload, thus improving the overall throughput of the stage in performing the task. Instances in a stage may also perform different tasks from one another to enable the parallel performance of different tasks. Instances can supply data to more than one instance, while other instances may collect data and process data from multiple instances.

In the illustrated embodiment, each instance of each stage of a pipeline is typically implemented as an application-level module of computer program instructions executed on a separate IP block on a NOC, and each stage is assigned to a thread of execution on an IP block of a NOC. Each stage is assigned a stage 1D, and each instance of a stage is assigned an identifier. HIP 212 (FIG. 5) typically sets up the pipeline by configuring each stage with a desired number of instances, with the network location of each instance of each stage provided to other instances of other stages to enable each instance to send its resultant workload to the proper instance in the next stage. earlier and/or later stage 3 to which an instance of stage 2 is authorized to send its resultant workload. Multiple instances may be assigned to a particular stage to provide additional processing resources relative to other stages, e.g., so work flows through the pipeline as efficiently as possible, and no single stage presents a bottleneck to performance. It will also be appreciated that workload monitoring may be performed during runtime, and that instances may be dynamically added or removed from a stage as needed for balancing the load among the stages of the pipeline.

Each stage is configured with a stage ID for each instance of a next stage, which may also include the number of instances in the next stage as well as the network location of each instance of that. Configuring a stage with IDs for instances of a next stage provides the stage with the information needed to carry out load balancing across stages. Such load balancing can be carried out, for example, by monitoring the performance of the stages and instantiating a number of instances of each stage in dependence upon the performance of one or more of the stages. Monitoring the performance of the stages can be carried out by configuring each stage to report performance statistics to a separate monitoring application that in turn is installed and running on another thread of execution on an IP block or HIP. Performance statistics can include, for example, time required to complete a data processing task, a number of data processing tasks completed within a particular time period, and so on, as will occur to those of skill in the art. Instantiating a number of instances of each stage in dependence upon the performance of one or more of the stages can be carried out by instantiating, by an HIP, a new instance of a stage when monitored performance indicates a need for a new instance.

Multithreaded Rendering Pipeline Architecture with Network-Based Streaming of Shared State Changes Now turning to FIG. 7, this figure illustrates an implementation of processing unit 200 configured to implement a multithreaded rendering pipeline architecture consistent with the invention. In particular, FIG. 7 illustrates a multithreaded rendering pipeline 230 incorporating a grouper stage with one or more grouper units 232, a geometry engine stage with one or more geometry engines 234, a post geometry engine (Post GE) stage including one or more post GE units 236, a rasterizer stage including one or more rasterizers 238 and pixel shading stage including one or more pixel shaders 240.

Each processing element or unit 232, 234, 236, 238, 240 is desirably implemented within an IP block in a node in NOC 102, with each such unit assigned at least one dedicated hardware thread. Each unit is typically disposed on a separate node, although in other embodiments multiple units may be disposed in a single node. Moreover, each unit may be allocated multiple threads of execution in some embodiments. Time-slice based software multithreading may also be implemented in some embodiments, although it is desirable in the illustrated embodiment that multiple units not be wholly implemented on the same hardware-based thread.

Each grouper unit 232 is used to group data for streaming down the pipeline, e.g., by pulling related vertices from an object array. Each geometry engine 234 is typically used to perform object transformations and generate the geometric primitives, while each post GE unit 236 is configured to perform post processing of the geometric primitives such as perspective divides, culling, sorting, breaking up geometry, etc.

Each rasterizer 238 is configured to operate as a pixel fragment generator to generate a stream of pixel fragment data sets that characterize one pixel, a fraction of one pixel or more than one pixel from a primitive input to the rasterizer. Among other operations, each rasterizer typically performs a scan line conversion of coordinates in a primitive to (u, v) texture coordinates in a texture to be applied to the primitive. Each pixel shader 240, in turn, takes the pixel fragment data sets and applies or updates the colors of one or more pixels in a frame buffer 242, typically using texture filtering and other shading techniques. It will be appreciated that the specific operations performed by units 232, 234, 236, 238 and 240 in terms of implementing a raster-based rendering pipeline that renders image data for a scene may incorporate any number of known rendering techniques, enhancements and algorithms, and that the implementation of such techniques in the appropriate units would be well within the abilities of one of ordinary skill in the art having the benefit of the instant disclosure. It will also be appreciated that other rendering algorithms, e.g., using physical rendering techniques such as ray tracing or photon mapping, may also be implemented in a multithreaded pipeline consistent with the invention, and that such techniques may rely on different and/or additional pipeline stages not illustrated in FIG. 7. Therefore, the invention is not limited to the particular raster-based rendering pipeline architecture represented in FIG. 7.

Commands and data may be passed from stage to stage in pipeline 230, while some data, including shared context or state data, is not passed directly from stage to stage, but is instead maintained in shared memory 208 and accessed by each stage as needed. Among this shared data may be included a rolling context data structure, implemented in FIG. 7 as a render context table 244, and which is described in greater detail in the aforementioned '573 application. Within render context table are a plurality of render contexts 246, with each render context storing shared state data that may be used by various stages in pipeline 230.

In the illustrated embodiment, the stages in pipeline 230 maintain locally cached copies 248 of relevant render contexts such that shared memory 208 need not be accessed each time a stage needs to access data in a render context. Furthermore, consistent with the invention, whenever the data in a render context is changed, the changes are propagated to the various stages in pipeline 230 using the on-chip network for NOC 102, and typically without requiring the stages to access shared memory 208 or otherwise perform a cache synchronization with the master copy of the render context stored in the shared memory, e.g., through the use of a conventional directory-based or snoop-based cache coherency protocol. Instead, the changes to a render context, rather than a complete render context, are streamed to the stages via the NOC on-chip network to enable the stages to locally update their local copies of the render context.

Figure 8:
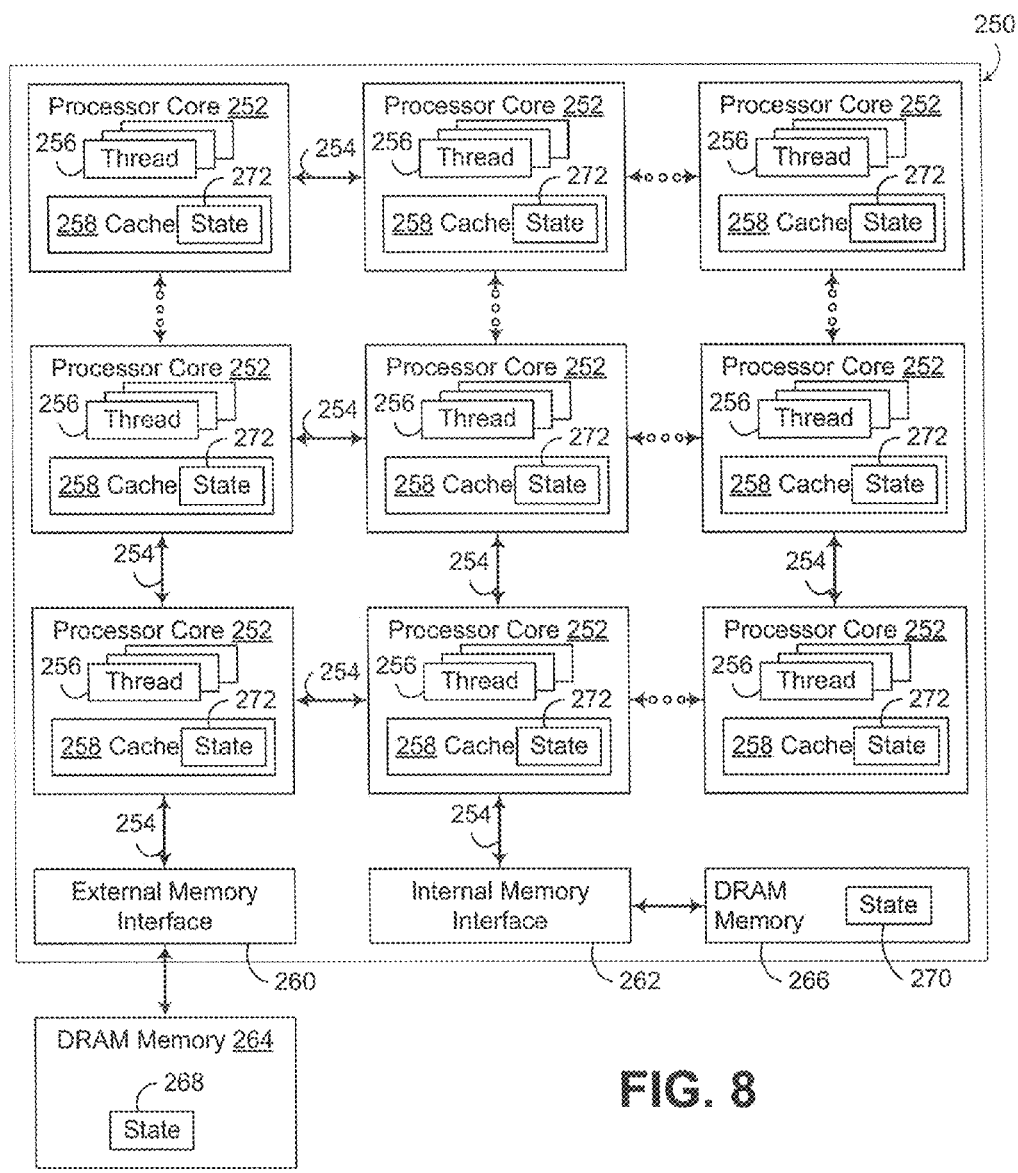
FIG. 8 is a block diagram of a NOC suitable for hosting the multithreaded rendering pipeline of FIG. 7.

Turning to FIG. 8, this figure illustrates a hardware configuration of a NOC 250, similar to NOC 102 of FIGS. 2-4, and suitable for hosting a multithreaded rendering software pipeline such as pipeline 230 of FIG. 7, but also described more abstractly to better illustrate the broader applicability of the architecture for propagating state data changes to multiple parallel threads of execution in a manner consistent with the invention. NOC 250 includes a plurality of processor cores 252 interconnected with one another via an on-chip network 254. Each processor core 252 includes one or more hardware-based parallel threads of execution 256, as well as one or more levels of cache memory 258. Furthermore, on-chip network 254 may also couple processor cores 252 to additional levels of memory, e.g., via external and/or internal memory interfaces 260, 262 coupled respectively to external and/or internal DRAM memory arrays 264, 266.

NOC 250 in this embodiment is considered highly multi-threaded, including a relatively large number of processor cores 252 and parallel threads of execution 256. Furthermore, on-chip network 254, configured with routers and links similar to those described above in connection with FIGS. 2-4, provides a comparatively greater network bandwidth, and a comparatively lower latency, between respective processor cores 252 than between processor cores 252 and memories

264, 266. In particular, memory interfaces 260, 262, as compared to on-chip network 254, typically would create a performance bottleneck were a large number of threads of execution to attempt to access a shared memory at roughly the same time.

It will be appreciated, however, that other embodiments of the invention may utilize alternate processor core architectures and/or network architectures. Furthermore, different levels of memories may be implemented within NOC 250, e.g., providing various levels of caches within each processor core, providing dedicated or shared caches for individual threads of execution, providing dedicated or shared caches for individual processor cores, providing caches that are shared by the entire NOC 250, providing dedicated memory arrays in individual processor cores, etc. In addition, a NUMA architecture may be used in some embodiments of the invention. It will also be appreciated that FIG. 8 is simplified in nature, and as such, implementation details, e.g., multiple levels of cache memory, execution units, instruction units, memory controllers, and other support circuitry have been omitted for the sake of simplicity.

FIG. 8 also illustrates a master copy of a shared state, shown alternately at 268 in external shared memory 264 and at 270 in internal shared memory 266, as well as locally cached copies 272 of the shared state. A shared state may encompass a wide variety of different types of information for which it may be desirable to provide to multiple parallel threads of execution in a multithreaded processing environment. As shown in FIG. 9, for example, a shared state 280 may include data (parameters) 282 and/or instructions (program code) 284. A thread may have access to multiple shared states, and different shared states may be used by different collections of threads. Moreover, the type of data stored in a shared state will typically vary widely depending upon the particular application.

In the illustrated embodiment, for example, a shared state is implemented as a render context, which may include a substantial amount of data, e.g., two or more kilobytes. In other embodiments, however, shared state data may also include other state-related data, or executable instructions, such that propagation may be used to efficiently update program code executed by multiple parallel threads of execution, thus effectively reprogramming those threads of execution.

Returning to FIG. 8, embodiments consistent with the invention, in response to a change in the shared state, propagate the change to the processor cores 252, and thus to the threads of execution 256, via on-chip network 254. Typically, the master copy 268, 270 of the shared state in memory 264 and/or 266 is also updated whenever the shared state changes; however, it will be appreciated that any update to a memory 264, 266 occurs separate from the propagation of changes to the processor cores, and that the processor cores and their respective threads of execution do not attempt to access either memory 264, 266, e.g., to retrieve an updated copy of the shared state, when propagating changes to the shared state.

Given the packet-based nature of on-chip network 254, changes are typically propagated through the use of change packets, e.g., as shown at 290 in FIG. 10. A change packet 290 may take a number of forms in different applications. In the illustrated embodiment, a change packet 290 includes an identifier 291 for the shared state to be changed, and one or more change opcodes 292, which provide instructions to a thread to enable the thread to locally update its cached copy of the shared state. For example, a change opcode 292 may instruct a thread to delete a portion of the state, add a new portion to the state, or modify or replace a portion of the state. Any new or modified portion may be provided in field 294, and as noted above, since a shared state may include data and/or instructions, field 294 may include one or both of data and instructions. In addition, the change opcode 292 may include an index or offset into the shared state that points to a position at which the changes should be made.

Alternatively, a change packet may provide instructions that are executable by the thread to modify its local copy of the shared state, e.g., in field 296. As another alternative, a function used to modify a shared state may already be stored locally in a thread, whereby a change may be effected merely by providing a pointer 298 to the function that should be executed in order to implement the change. It will be appreciated that field 294 may also be used in these latter two instances to operate as input parameters to the function or executable instructions executed by the thread when updating its local copy of the shared state.

It will be appreciated that in some embodiments, one or more of the different types of update methodologies may not be supported. In addition, given the innumerable number of manners in which network packets may be formatted, the manner in which a change packet may instruct a thread to update its local copy of a shared state may vary greatly in different embodiments.

Figure 11:
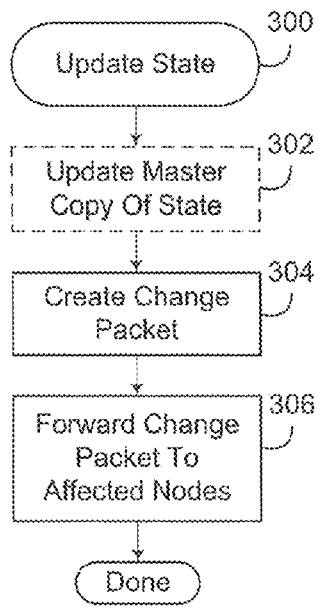
FIG. 11 is a flowchart illustrating the program flow of an update state routine executed by a thread in the NOC of FIG. 8.
Figure 12:
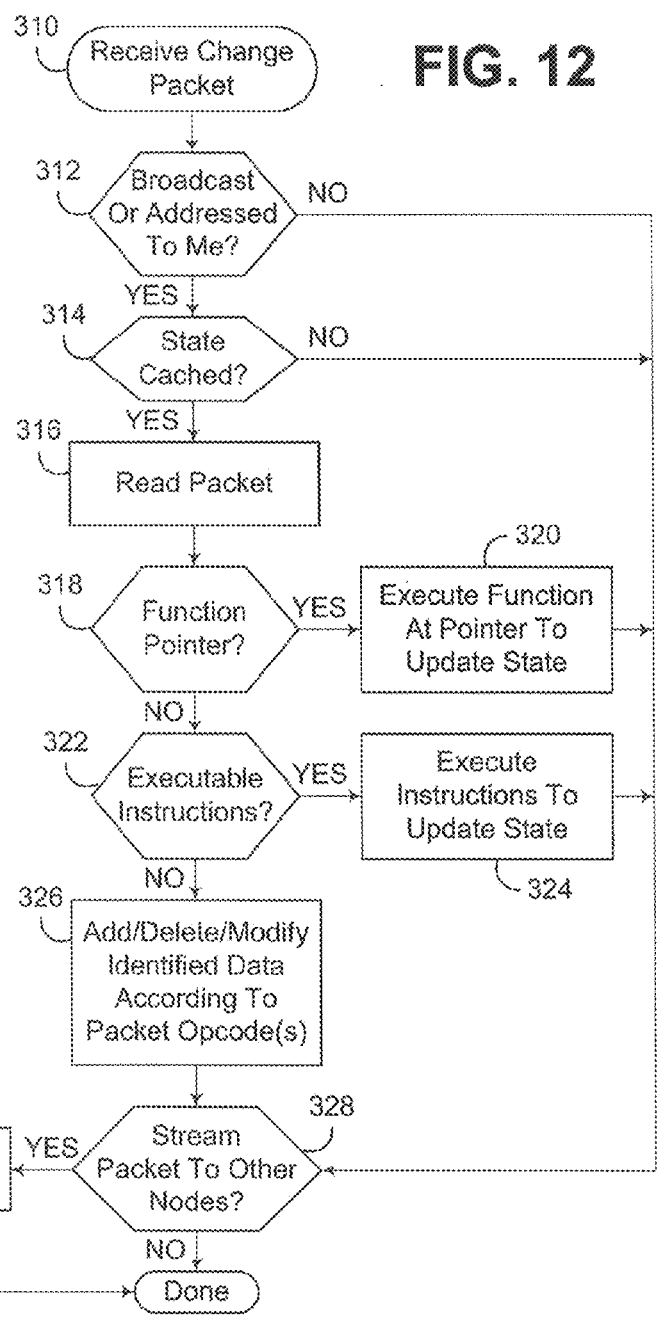
FIG. 12 is a flowchart illustrating the program flow of a receive change packet routine executed by a thread in the NOC of FIG. 8.

FIGS. 11 and 12 next illustrate one exemplary manner in which changes may be propagated to multiple threads of execution in NOC 250. FIG. 11, in particular, illustrates an update state routine 300 executed, for example, by one of the threads 256 in NOC 250. For example, routine 300 may be executed by a thread 256 functioning as host interface processor 212 of FIG. 7, which manages the overall operation of pipeline 230. It will be appreciated that each thread 256 already includes a locally cached copy of a shared state. The locally cached copy may be obtained, for example, during an initialization phase, and may include a conventional retrieval of the shared state from a shared memory responsive to an access to the shared state by a thread.

Routine 300 begins in block 302 by optionally updating the master copy of the shared state, e.g., via a memory write operation that is separate from the herein-described synchronization technique.

Routine 300 may be executed, for example, at the start of the rendering process for a new frame, or any other time it is desirable to update the shared state. It will appreciated that in other embodiments, routine 300 could be called in response to detecting a change made to a master copy of a shared state.

Next, block 304 creates an appropriate change packet 304, providing sufficient information to enable a thread to locally update its locally cached copy of the shared state. Next, block 306 forwards the change packet to the affected nodes, i.e., the particular processor cores or threads of execution holding a local copy of the shared state. Routine 300 is then complete. In other embodiments, it may also be desirable to also incorporate an acknowledgment protocol to verify that each thread has received the change packet and updated its local copy accordingly.

FIG. 12 illustrates a receive change packet routine 310 executed by each thread 256 receiving a change packet. Routine 310 begins in block 312 by first determining whether the change packet is a broadcast packet or is otherwise addressed to the thread. In the illustrated embodiment, for example, different types of packets may be supported. Broadcast packets, for example, may be processed by all processor cores in NOC 250. Multicast packets, for example, may specify multiple processor cores or threads such that a given packet will be processed by multiple threads. Individually addressed packets, which are directed to individual processor cores or threads, may also be supported. In other embodiments, broadcasting or multicasting may not be supported, whereby a separate packet would be sent to each affected processor core or thread.

If the packet is broadcast or otherwise addressed to the thread or processor core, block 312 passes control to block 314 to determine whether the shared state that is the subject of the packet is locally cached by the thread or processor core, e.g., using the state identifier 291 (FIG. 10). If so, control passes to block 316 to read the packet contents to determine how to update the locally cached copy of the state.

If, for example, a function pointer is provided (field 298 of FIG. 10), block 318 passes control to block 320 to execute the function specified by the pointer to update the state, optionally using additional data provided in the packet. If, on the other hand, executable instructions are supplied (field 296 of FIG. 10), block 322 passes control to block 324 to execute those instructions to update the state. Otherwise, control passes to block 326 to add, delete and/or modify data in the state based upon the packet opcode(s) (field 292 of FIG. 10). It will be appreciated that in some embodiments, multiple opcodes, function pointers and/or executable instructions may be provided in a given packet such that multiple types of updates may be performed in response to a single packet.

Irrespective of the manner in which the state is updated, each of blocks 320, 324 and 326 passes control to block 328 to determine whether a need exists to stream the packet to any other affected nodes (e.g., when using a store and forward network architecture). If not, routine 310 is complete. Otherwise, control passes to block 330 to forward the change packet to one or more additional processor cores or threads, prior to terminating the routine. In addition, returning to blocks 312 and 314, if either the packet is not addressed to the local thread or processor core, or the subject of the packet is not locally cached, blocks 312 and 314 pass control directly to block 328.

It will be appreciated that blocks 312, 328 and 330 will typically be performed within the networking logic associated with a given processor core, rather than at the thread level. Furthermore, in this embodiment, a streaming-type propagation methodology is used, whereby packets are received by processor cores, processed if one or more threads are intended destinations of such packets, and forwarded along to other processor cores as necessary. In other embodiments, e.g., using other network architectures, processor cores may not stream packets to other processor cores such that, for example, a packet sent over network 254 will be received by all affected processor cores and processed accordingly, without the need to forward the packet along to other processor cores.

Therefore, through the use of routines 300 and 310, NOC 250 is able to propagate changes to a shared state to multiple hardware-based parallel threads of execution without requiring individual threads to have to access a shared memory in order to retrieve a master copy of a shared state, thereby accelerating the update process and minimizing typically higher latency accesses to the shared memory. Furthermore, as only the changes are propagated, rather than updated copies, the amount of data is typically reduced. Using the example of a typical render context, which may be two or more kilobytes of data, a change to a single parameter, requiring at most a few bytes of data, may be propagated using a substantially reduced amount of data, thereby minimizing processing and communications overhead associated with the update to the shared state.

Various modifications may be made consistent with the invention. Therefore, the invention lies in the claims hereinafter appended.

What is claimed is:

1. A circuit arrangement, comprising:
a shared memory within which is stored a copy of a shared state used in connection with rendering an image;
a plurality of processing cores coupled to one another in a network on chip configuration by a packet-based on-chip network, the plurality of processing cores defining a plurality of parallel threads of execution, and each processing core including a cache memory within which is stored a locally cached copy of the shared state; and
a multithreaded rendering software pipeline hosted by at least a subset of the plurality of processing cores, the multithreaded rendering software pipeline including a plurality of stages configured to perform work in connection with rendering an image in a buffer;
wherein the multithreaded rendering software pipeline is further configured to propagate changes to the shared state to the plurality of processing cores by streaming change packets to stages in the multithreaded rendering software pipeline to cause each processing core to update its locally cached copy of the shared state without attempting to access the copy of the shared state in the shared memory, wherein the multithreaded rendering software pipeline is further configured to, in response to a first change made to a first locally cached copy of the shared state associated with a first processing core, propagate the first change to second and third processing cores to cause the second and third processing cores to respectively modify state data in second and third locally cached copies of the shared state respectively associated with the second and third processing cores to incorporate the first change into the second and third locally cached copies of the shared state such that an accesses to the second and third locally cached copies of the shared state that occur after the first change is propagated access the modified state data.

2. A circuit arrangement, comprising:
multithreaded hardware logic including a plurality of parallel threads of execution, wherein at least a subset of the plurality of parallel threads of execution maintain a locally cached copy of a shared state that is additionally stored in a shared memory accessible via a memory interface;
an on-chip communications network coupling together the plurality of parallel threads of execution; and
control logic configured to propagate changes to the shared state to multiple parallel threads of execution from among the at least a subset of the plurality of parallel threads of execution through the on-chip communications network and without attempting to access the copy of the shared state in the shared memory, wherein the control logic is configured to, in response to a first change made to a first locally cached copy of the shared state associated with a first parallel thread of execution, propagate the first change to second and third parallel threads of execution to cause the second and third parallel threads of execution to respectively modify state data in second and third locally cached copies of the shared state respectively associated with the second and third parallel threads of execution to incorporate the first change into the second and third locally cached copies of the shared state such that accesses to the second and third locally cached copies of the shared state that occur after the first change is propagated access the modified state data.

3. The circuit arrangement of claim 2, wherein the shared memory comprises a dynamic random access memory array that is external to the multiple parallel threads of execution, and wherein the control logic is configured to propagate changes to the shared state to the multiple parallel threads of execution without attempting to synchronize the locally cached copies for the multiple parallel threads of execution with the copy in the shared memory.

4. The circuit arrangement of claim 2, wherein the plurality of parallel threads of execution are resident in a plurality of processing cores arranged in a network on chip arrangement on an integrated circuit, wherein the on-chip communications network comprises a packet-based network, and wherein the control logic is configured to propagate the changes to the shared state by sending change packets to at least a subset of the plurality of processing cores via the packet-based network.

5. The circuit arrangement of claim 4, wherein the control logic is configured to propagate the changes to the shared state by sending a broadcast change packet to the subset of the plurality of processing cores.

6. The circuit arrangement of claim 4, wherein the control logic is configured to propagate the changes to the shared state by sending a change packet addressed to at least one of the plurality of processing cores.

7. The circuit arrangement of claim 4, wherein the control logic is configured to send a change packet that includes a new value for a parameter in the shared state, and wherein at least one parallel thread of execution is configured to, in response to receiving the change packet, update the parameter in the locally cached copy of the shared state for such parallel thread of execution using the new value.

8. The circuit arrangement of claim 4, wherein the control logic is configured to send a change packet that includes a plurality of instructions, and wherein at least one parallel thread of execution is configured to, in response to receiving the change packet, execute the plurality of instructions to update the locally cached copy of the shared state for such parallel thread of execution.

9. The circuit arrangement of claim 4, wherein the control logic is configured to send a change packet that includes a pointer to a plurality of instructions, and wherein at least one parallel thread of execution is configured to, in response to receiving the change packet, use the pointer to execute the plurality of instructions to update the locally cached copy of the shared state for such parallel thread of execution.

10. The circuit arrangement of claim 4, wherein the multithreaded hardware logic is highly multithreaded, and wherein the on-chip network has a substantially greater bandwidth than a memory interface to a memory within which a master copy of the shared state is stored.

11. The circuit arrangement of claim 4, further comprising a multithreaded software pipeline hosted by at least a subset of the plurality of processing cores, the multithreaded software pipeline including a plurality of stages, and wherein the control logic is configured to propagate the changes to the shared state by streaming change packets to the plurality of stages in the pipeline.

12. The circuit arrangement of claim 11, wherein the multithreaded software pipeline is configured to render an image in a buffer, and wherein the shared state includes a render context.

13. The circuit arrangement of claim 2, wherein the shared state includes program code executable by each of the subset of parallel threads of execution, and wherein the control logic is configured to propagate the changes to the shared state by updating locally cached copies of the program code for the subset of parallel threads of execution.

14. An integrated circuit device including the circuit arrangement of claim 2.

15. A program product comprising a non-transitory computer readable medium and logic definition program code resident on the computer readable medium and defining the circuit arrangement of claim 2.

16. A method of communicating state changes to a shared state that is locally cached by at least a subset of parallel threads of execution from among a plurality of parallel threads of execution resident in multithreaded hardware logic and that is additionally stored in a shared memory accessible via a memory interface, the method comprising:
propagating changes to the shared state to multiple parallel threads of execution from among the at least a subset of the plurality of parallel threads of execution through an on-chip communications network that couples together the plurality of parallel threads of execution without attempting to access a copy of the shared state in the shared memory, wherein propagating changes includes, in response to a first change made to a first locally cached copy of the shared state associated with a first parallel thread of execution, propagating the first change to second and third parallel threads of execution to cause the second and third parallel threads of execution to respectively modify state data in second and third locally cached copies of the shared state respectively associated with the second and third parallel threads of execution to incorporate the first change into the second and third locally cached copies of the shared state such that accesses to the second and third locally cached copies of the shared state that occur after the first change is propagated access the modified state data.

17. The method of claim 16, wherein the shared memory comprises a dynamic random access memory array that is external to the multiple parallel threads of execution, and wherein propagating changes to the shared state to the multiple parallel threads of execution is performed without attempting to synchronize the locally cached copies for the multiple parallel threads of execution with the copy in the shared memory.

18. The method of claim 16, wherein the plurality of parallel threads of execution are resident in a plurality of processing cores arranged in a network on chip arrangement on an integrated circuit, wherein the on-chip communications network comprises a packet-based network, and wherein propagating the changes to the shared state includes sending change packets to at least a subset of the plurality of processing cores via the packet-based network.

19. The method of claim 18, wherein propagating the changes to the shared state includes sending a broadcast change packet to the subset of the plurality of processing cores.

20. The method of claim 18, wherein propagating the changes to the shared state includes sending a change packet addressed to at least one of the plurality of processing cores.

21. The method of claim 18, wherein propagating the changes to the shared state includes sending a change packet that includes a new value for a parameter in the shared state, the method further comprising, in at least one parallel thread of execution and in response to receiving the change packet, updating the parameter in the locally cached copy of the shared state for such parallel thread of execution using the new value.

22. The method of claim 18, wherein propagating the changes to the shared state includes sending a change packet that includes a plurality of instructions, the method further comprising, in at least one parallel thread of execution and in response to receiving the change packet, executing the plurality of instructions to update the locally cached copy of the shared state for such parallel thread of execution.

23. The method of claim 18, wherein propagating the changes to the shared state includes sending a change packet that includes a pointer to a plurality of instructions, the method further comprising, in at least one parallel thread of execution and in response to receiving the change packet, using the pointer to execute the plurality of instructions to update the locally cached copy of the shared state for such parallel thread of execution.

24. The method of claim 18, wherein at least a subset of the plurality of processing cores hosts a multithreaded rendering software pipeline, the multithreaded software pipeline including a plurality of stages, and wherein propagating the changes to the shared state includes streaming change packets to the plurality of stages in the pipeline, and wherein the shared state includes a render context.

25. The method of claim 16, wherein the shared state includes program code executable by each of the subset of parallel threads of execution, and wherein propagating the changes to the shared state includes updating locally cached copies of the program code for the subset of parallel threads of execution.

* * * * *